US006977994B2

(12) United States Patent
Stephenson et al.

(10) Patent No.: US 6,977,994 B2
(45) Date of Patent: Dec. 20, 2005

(54) PORTABLE, HIGH PERFORMANCE MESSAGING SYSTEM

(75) Inventors: Kenneth J. Stephenson, Mission Viejo, CA (US); Michael L. Yeung, Mission Viejo, CA (US); Amir Shahindoust, Laguna Niguel, CA (US); Carl Byington, Blue Jay, CA (US)

(73) Assignees: Toshiba Tec Kabushiki Kaisha, (JP); Toshiba Corporation, (JP)

( * ) Notice: Subject to any disclaimer, the term of this patent is extended or adjusted under 35 U.S.C. 154(b) by 741 days.

(21) Appl. No.: 10/108,655

(22) Filed: Mar. 27, 2002

(65) Prior Publication Data

US 2003/0185355 A1 Oct. 2, 2003

(51) Int. Cl.[7] .............................................. H04M 11/00
(52) U.S. Cl. ............................ 379/93.01; 379/100.01; 358/1.15; 709/201; 710/20
(58) Field of Search ......................... 379/93.01, 93.09, 379/93.11, 93.15, 100.01, 100.09, 100.13, 379/100.15; 709/201, 212–219, 221, 226, 709/240; 710/8, 15–19, 20, 21, 52–57

(56) References Cited

U.S. PATENT DOCUMENTS

| 4,441,163 A | | 4/1984 | Leikam et al. | |
|---|---|---|---|---|
| 4,466,065 A | | 8/1984 | Advani et al. | |
| 4,649,473 A | | 3/1987 | Hammer et al. | |
| 4,649,479 A | | 3/1987 | Advani et al. | |
| 4,754,428 A | * | 6/1988 | Schultz et al. | ............... 709/246 |
| 4,807,111 A | | 2/1989 | Cohen et al. | |
| 5,179,708 A | | 1/1993 | Gyllstrom et al. | |
| 5,247,661 A | | 9/1993 | Hager et al. | |
| 5,280,585 A | * | 1/1994 | Kochis et al. | ................. 710/48 |
| 5,303,336 A | * | 4/1994 | Kageyama et al. | ......... 358/1.15 |
| 5,353,388 A | * | 10/1994 | Motoyama | .................. 358/1.18 |
| 5,434,978 A | | 7/1995 | Dockter et al. | |
| 5,465,364 A | | 11/1995 | Lathrop et al. | |
| 5,557,744 A | | 9/1996 | Kobayakawa et al. | |
| 5,596,725 A | | 1/1997 | Ferguson et al. | |
| 5,619,649 A | | 4/1997 | Kovnat et al. | |
| 5,625,757 A | * | 4/1997 | Kageyama et al. | ......... 358/1.14 |
| 5,630,060 A | | 5/1997 | Tang et al. | |
| 5,666,490 A | | 9/1997 | Gillings et al. | |
| 5,696,894 A | * | 12/1997 | Ono | ........................... 358/1.15 |
| 5,805,922 A | | 9/1998 | Sim et al. | |
| 5,890,208 A | | 3/1999 | Kwon | |
| 5,905,852 A | * | 5/1999 | Love et al. | ................. 358/1.15 |
| 5,960,164 A | * | 9/1999 | Dorfman et al. | ........... 358/1.11 |
| 5,983,292 A | | 11/1999 | Nordstrom et al. | |
| 5,999,964 A | | 12/1999 | Murakata et al. | |

(Continued)

OTHER PUBLICATIONS

Harr Newton, Newton's Telecom Dictionary, Flatiron Publishing, Mar. 1998, 14th Ed., p. 437.*

*Primary Examiner*—Fan Tsang
*Assistant Examiner*—Olisa Anwah
(74) *Attorney, Agent, or Firm*—Tucker Ellis & West LLP

(57) ABSTRACT

A method and implementation is disclosed for messaging between components, preferably the controllers of peripheral devices in a network. The method and implementation includes providing a message from a first process and appending to the message a code indicating at least one descriptive parameter of the message. Steps and implementations are included for transmitting the message to a second process and interpreting the code so as to enable computation of the message by the second process across a plurality of different controller platforms.

32 Claims, 1 Drawing Sheet

U.S. PATENT DOCUMENTS

| | | |
|---|---|---|
| 6,069,624 A | 5/2000 | Dash et al. |
| 6,078,406 A | 6/2000 | Nickerson |
| 6,145,061 A | 11/2000 | Garcia et al. |
| 6,173,378 B1 | 1/2001 | Rozario et al. |
| 6,175,839 B1 | 1/2001 | Takao et al. |
| 6,260,050 B1 | 7/2001 | Yost et al. |
| 6,338,133 B1 | 1/2002 | Schroter |
| 6,343,351 B1 | 1/2002 | Lackman et al. |
| 6,347,341 B1 | 2/2002 | Glassen et al. |
| 2002/0085850 A1* | 7/2002 | Nakata et al. ............... 399/66 |
| 2002/0186407 A1* | 12/2002 | Laughlin ............... 358/1.15 |
| 2003/0090697 A1* | 5/2003 | Lester et al. ............... 358/1.14 |

* cited by examiner

PORTABLE, HIGH PERFORMANCE MESSAGING SYSTEM

BACKGROUND OF THE INVENTION

The present invention is directed to the field of messaging systems of the type used exchange messages between various types of peripheral office components, including copiers, printers, fax machines and the like. The invention has particular applicability as used in a network where messages are exchanged between components of various makes and models, which may be implemented with different types of operating systems.

In a network messaging has many uses, including the management of peripheral output. For example, if a network printer has a long queue of pending print jobs, messages can be exchanged between peripheral components to identify a suitable printer for off-loading a priority print job. In a typical enterprise roll-out, it is common for a variety of components to be used, having a number of different makes and models, and even employing different operating systems. In these instances, it can be difficult or impossible for these components to exchange messages with each other, resulting in delays, confusion and general inefficiency.

In general, the inter-process communication (IPC) mechanisms deployed by the embedded software controllers of such peripheral devices tend to not be portable across operating system platforms. Performance is also affected by the restrictions imposed by the native IPC mechanisms on the platforms of interest. For example, sockets are too basic to basic to satisfy cross-platform messaging requirements. On the other hand, RPC (remote procedure call) is too complex and slow to be effective. Also, shared memory must reside on the same hardware. Some IPC mechanisms, such as those deployed by Toshiba Controller software SC-2/3 (used by the present assignee) require the extensive use of the Windows NT registry for event notification and job control, and thus cannot be ported to other types of operating systems.

SUMMARY OF THE INVENTION

The difficulties and drawbacks encountered in previous-type systems are satisfied by the method and implementation of the present invention for messaging between components, preferably the controllers of peripheral devices in a network. The method and implementation includes providing a message from a first process and appending to the message a code indicating at least one descriptive parameter of the message. Steps and implementations are included for transmitting the message to a second process and interpreting the code so as to enable computation of the message by the second process across a plurality of different controller platforms.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

Figure 1:
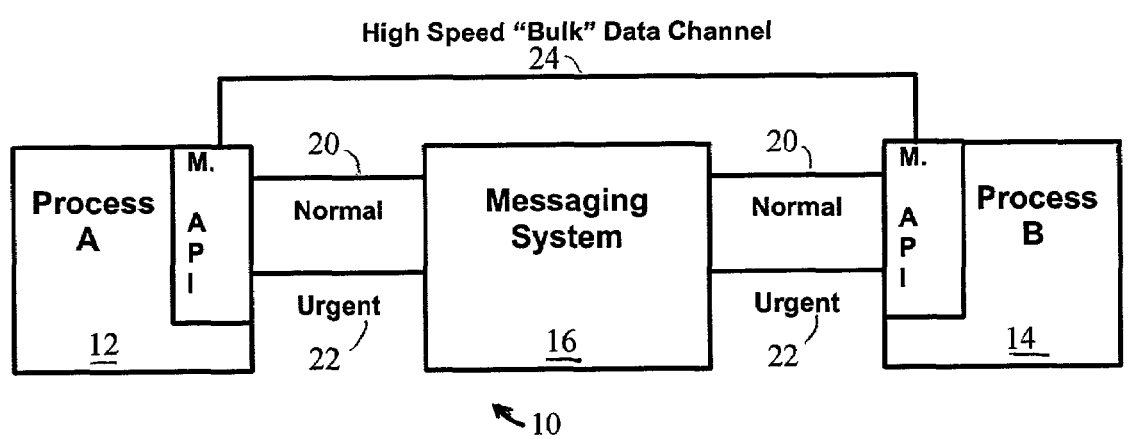
FIG. 1 is schematic diagram showing an exemplary embodiment of the present invention.

The present invention includes an easily portable, high performance, centralized, messaging system that can be implemented as a daemon, service, stand-alone GUI-less application, or any other suitable implementation. The messaging system preferably employs TCP sockets for all IPC communication, making the present system very portable across NT, VxWorks, Linux and other Unix platforms, and can also be adapted to any other operating system or other platforms without departing from the invention. In another aspect of the invention, the invention includes a simple, flexible, object oriented, and operating system-independent messaging interface class compiled and linked into all controller processes to enable the communication between processes via the messaging system.

The present invention as described therefore includes a method and software implementation for messaging between components, preferably the software controllers of peripheral devices in a network, such as printers, copiers and fax machines. The present invention includes providing a message from a first process and appending to the message a code indicating at least one descriptive parameter of the message. Steps and implementations are included for transmitting the message to a second process and interpreting the code so as to enable computation of the message by the second process across a plurality of different controller platforms.

FIG. 1 shows a system 10 including a first controller process 12 ("Process A") and a second controller process 14 ("Process B"), where the processes are system component applications or a shared library of such applications. The processes 12, 14 are connected to a central messaging system 16 with a respective pair of connections 20, 22, preferably a pair of standard TCP sockets. The messaging system 16 can be a daemon, service, GUI-less application, or the like whose main responsibility is make sure all received messages are sent to the client processes 12, 14 that are registered to receive them. It should be appreciated that FIG. 1 simply illustrates a simple dual process system. However, any number of processes can be simultaneously connected to the messaging system 16 without departing from the invention. It will be understood that the number of connections is limited only by the hardware and operating system constraints of the system 10, such as memory and the maximum number of TCP socket connections that can be open at once, and any of these can respectively varied by the person skilled in the art, without placing any restrictions on the scope of the invention.

The two connections 20, 22 are respectively identified as "Normal" and "Urgent" in FIG. 1. The "Normal" channel 20 is used for typical inter-process communication such as that required for job control and flow, requesting and receiving status. The "Normal" channel connection to the messaging system is opened once at process startup and remains active until process shutdown. The "Urgent" channel 22 is used for high-priority messages such as system shutdown messages. Processes should service urgent messages before any normal messages in its queue. Like the Normal Channel, the Urgent Channel connection to the Messaging System is opened once at process startup and remains active until process shutdown. Providing separate channels in this manner insures message delivery and provides congestion control. It also enables a system upgrade whereby a networked collection of messaging systems can be operated with independent controllers.

The system 10 also includes a high speed "bulk" data channel 24 for moving large amounts have data (typically greater than 1K) directly between the two processes 12, 14 or when the highest possible communication rate is required. In the high speed "bulk" data channel 24, the messaging system 16 supports a dedicated data channel between communicating processes for bulk data transfers to avoid loading the messaging system 16. Since it is not feasible to open a dedicated channel between all possible process pairs in the system, the messaging system allows each process to create a listening socket. When the data source (i.e. the process that will be transmitting the bulk data) connects to that listening socket, a high speed "bulk" connection is spawned. When the data transmission is finished, the messaging system 16 closes the socket from both ends. Unlike the "Normal" and "Urgent" channels, the high speed data channel connection 24 is opened before and closed after each transfer session.

Each controller process 12, 14 contains a respective instance of a message interface class 32, 34, which will be responsible for transmitting and receiving messages. In the preferred embodiment, the message interface class is identified as "M. API" as shown in FIG. 1, where M. API is understood to be the "Messaging Application Programming Interface," a messaging interface class that is compiled and linked into each of the messaging system's client processes.

Prior to transmitting a message between the first process 12 and the second process 14, a code is appended to the message indicating at least one descriptive parameter of the message. The descriptive parameters of the appended code can include: an integer message sender; an integer message type; an integer message class; and an integer message priority. The message also contains an integer message length, and a message body. The message sender, type, class and priority are preferably the low-order 32 bits of an encryption string, preferably an MD5 string or the like. This allows the receiving controller process to interpret the code so as to enable computation of the message across a plurality of different controller platforms, thereby permitting independent computation of the message type codes by the transmitter and receiver, without a coordinating central registry of message types.

In the preferred embodiment, the messaging system 16 places no restrictions on the type of data or text a message body may contain. The messaging system 16 is isolated from any knowledge of the message body, other than it's size. If the two processes 12, 14 agree to send messages containing XML text, for example, the messaging system 16 would not be involved in the parsing or constructing the XML text. This would be the responsibility of the sending and receiving processes.

Prior to sending and receiving, the controller processes 12, 14 register with the messaging system 16 to receive messages. A specific client controller process may register multiple times to receive different subsets of messages. Each registration supplies a message tuple of descriptive parameter codes (sender, type, class, priority). Any of these descriptive parameters may be zero, which implies no filtering on that field. For example, a client controller could optionally register a message tuple (X,0,Z,P) to receive messages from sender X of class Z, and also register (0,Y,0,P) to receive messages of type Y from all senders. In these tuples, the sender field may be −1 to receive messages from all senders other than itself.

When a controller process registers to receive messages specified by a particular filter tuple, it can also specify a set of global parameters. The global parameters specified with the most recent registration message are used for defining the client connection. These global parameters include the delivery mode ("guaranteed" or "best effort," as explained below), a dead client age D in milliseconds, a stale message age A in milliseconds, a queue limit multiplier QM, and a queue limit divisor QD.

The default is "guaranteed delivery" mode, in which case QM=QD=1 and A is ignored. This mode preferably employs congestion control as described below, and if client using this mode is receiving messages from multiple transmitters it may not receive every message.

In "best effort" mode, the transmit queue limit uses the QM and QD parameters, and old messages (older than A) are flushed before trying to add new messages to the transmit queue for this client. However, the client is not precluded from receiving messages older than A since messages may spend a long time in the TCP/IP buffers. This age is only inspected when adding new buffers to the transmit queue, so the queue may contain some very old messages if no new messages arrive to be added to the queue. In this mode, the client can tune the maximum size of the transmit queue. "Best effort" mode is similar to guaranteed delivery mode but where the parameters defined as A=INT_MAX, QM=1, QD=1.

In order to provide congestion control, multiple controller processes may send messages of some type to a single controller process that has registered to receive messages of this type. If the receiving process cannot keep up, the buffer space in the Messaging System will fill up and the controller will deadlock. To prevent this, two defensive measures have been design to avoid this. First, each transmitting process is allowed a maximum of N outstanding messages in the buffers. These are messages that have been received from this transmitting process by the messaging system 16, but have not yet been sent to all the registered processes. Once this limit is reached, the messaging system 16 will not read from the socket for that transmitting process. This will cause the TCP/IP buffers for that socket to fill, and eventually the process will be unable to write to the socket. This pushes the congestion back to the transmitting process, which will then block or possibly simply avoid transmitting messages. Depending on the sophistication of the process code, there may be other useful work the process can perform, even though it cannot transmit messages.

Second, each receiving process is allowed at most M outstanding messages in the buffers. These are messages that have been received by the messaging system 16 from any source, but have not yet been transmitted to this process. Once this limit is reached, the messaging system 16 will treat new messages for this process as if they have already been delivered. In this case, the receiver will not receive all of the messages. This prevents a single slow receiving process from exhausting the buffer space in the server. The upper level protocols or interpretation of the message bodies must be able to handle dropped messages.

If only a single transmitter/receiver process pair is considered, simply setting N<=M would guarantee that congestion is pushed back on the transmitting process before starting to drop messages for the receiving process. In this case, no messages would be dropped. However, in the general case, a collection of T processes may all be sending messages of some type that are destined for a single process. If a setting of T*N<=M is applied, the congestion is pushed back on the transmitters before any messages are dropped.

B=total number of buffers
C=total number of active messaging client connections
T=3
N=B/C
M=T*N*QM/QD Any process listening for messages sent by more than T processes may not receive all the messages. Messages may be dropped in this case before any of the transmitting processes sees any congestion control. Note that in best effort mode, each process may specify the QM and QD parameters, so by setting QD=PARM_T, the process may specify QM as the number of transmitting processes to which this process may listen without worrying about dropped messages.

The above analysis assumes that the total number of processes connected to the messaging system 16 is relatively stable. If the messaging system 16 has only a few processes connected, and the processes almost fill the buffer space, and the messaging system 16 then gets a large number of new process connections, the system can still deadlock. To avoid this, the messaging system 16 makes use of the following configuration parameters:

E=estimate of total client connections after startup
C'=total number of active messaging client connections
C=max(E,C')//effective number of client connections Certain failure modes are defined. In a "chattering process," there is a process that is transmitting messages at a very high rate. Such a process won't be able to overwhelm either the messaging system 16 or any destination processes, since the messaging system 16 would simply be configured to stop reading from the socket before the buffer space is exhausted. This will eventually result in TCP/IP buffer exhaustion and force the process to block when writing to the socket. In a "dead process," there is a process that has registered to receive messages of some type, and the process then never reads from the socket to actually receive any of these messages. Whenever there is a new buffer to be added to the transmit queue, the messaging system 16 checks if the process is still alive. It is alive if the messaging system 16 has read bytes from or written bytes to the socket within the last D milliseconds, where D is specified in the process global parameters. Each process is responsible for setting this timer appropriately. In a "slow process," there is not much difference between a truly "dead" process and one that is very slow. If a process only services a few messages per second it will probably appear to the rest of the system that the process has crashed.

As described hereinabove, the present invention solves many problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. A method of messaging between networked document processing devices comprising:
   receiving into a central messaging system via a data network, a message from a first process associated with a first document processing device, the message including data representative of a document processing operation associated with the first document processing device;
   appending to a received message a code indicating at least one descriptive parameter of the message;
   transmitting, from the central messaging system via the network, an appended message to a second process associated with a second document processing device;
   interpreting the appended message in the second document processing device so as to enable computation of the message by the second process;
   opening, in accordance with an interpretation of the appended message, a second communication channel between first and second document processing devices, which second communication channel includes at least one of an urgent communication channel and a bulk communication channel.

2. The method of claim 1 wherein the components are peripheral components and wherein the first and second processes are controller processes for the peripheral components.

3. The method of claim 1 wherein the step of appending comprises appending the message at the first process.

4. The method of claim 1 wherein the step of appending comprises appending the message at a central messaging system intermediate to the first process and the second process.

5. The method of claim 4 wherein the messaging system resides on at least one of the first and second processes.

6. The method of claim 4 wherein, prior to the step of appending, connecting each process to the central messaging system via at least one socket.

7. The method of claim 6 wherein the at least one socket comprises a pair of TCP sockets, wherein the sockets are respectively identified as "normal" and "urgent" channels, wherein the "normal" channel is used for typical interprocess communication, and the "urgent" channel is used for high-priority messages, so as to insure delivery and provide congestion control.

8. The method of claim 1 wherein the appended code comprises at least one of an integer message sender, an integer message type, an integer message class, an integer message priority, an integer message length, and a message body.

9. The method of claim 8 wherein the at least one of the message sender, type, class and priority is comprised of low order bits of an encryption string.

10. The method of claim 1 wherein each process contains an instance of a message interface class, for transmitting and receiving messages.

11. The method of claim 10 wherein the message interface class is Messaging Application Programming Interface (M. API).

12. The method of claim 1 wherein, prior to the step of providing a message from a first process, registering the first and second processes with a messaging system to receive at least one respective type of messages.

13. A method of messaging between components comprising:
   registering first and second processes with a messaging system to receive at least one respective type of message;
   providing a message from a first process;
   appending to the message a code indicating at least one descriptive parameter of the message;
   transmitting the message to a second process; and
   interpreting the code so as to enable computation of the message by the second process across a plurality of different controller; wherein
   the appended code comprises a message tuple having a plurality of fields corresponding to the descriptive parameters and wherein the step of registering defines values for the message tuple that provide optional filtering according to the message types indicated by each field.

14. The method of claim 13 wherein the descriptive parameters indicated by the plurality of fields comprise integer message sender, integer message type, integer message class, and integer message priority.

15. The method of claim 13 wherein the step of registering comprises specifying a set of global parameters, wherein the global parameters are used for a client connection.

16. The method of claim 15 wherein the global parameters comprise: a message mode, selected from guaranteed delivery and best effort; a dead client age; a stale message age; a queue limit multiplier; and a queue limit divisor.

17. A messaging system for exchanging messages between networked document processing devices comprising:
    means for receiving into a central messaging system via a data network a message from a first process associated with a first document processing device, the message including data representat;
    means for appending to the received message a code indicating at least one descriptive parameter of the message;
    means for transmitting from the central messaging system via the network an appended the message to a second process associated with a second document processing device;
    means for interpreting the appended message in the second document processing device so as to enable computation of the message by the second process; and
    means for opening, in accordance with an interpretation of the appended message, a second communication channel between first and second document processing devices, which second communication channel includes at least one of an urgent communication channel and a bulk communication channel.

18. The messaging system of claim 17 wherein the components are peripheral components and wherein the first and second processes are controller processes for the peripheral components.

19. The messaging system of claim 17 wherein the means for appending comprises means for appending the message at the first process.

20. The messaging system of claim 17 wherein the means for appending comprises a central messaging system for appending the message, intermediate to the first process and the second process.

21. The messaging system of claim 20 wherein the messaging system resides on at least one of the first process and the second processes.

22. The messaging system claim 20 wherein, prior to the step of appending, connecting each process to the central messaging system via at least one socket.

23. The messaging system of claim 22 wherein the at least one socket comprises a pair of TCP sockets, wherein the sockets are respectively identified as "normal" and "urgent" channels, wherein the "normal" channel is used for typical inter-process communication, and the "urgent" channel is used for high-priority messages, so as to insure delivery and provide congestion control.

24. The messaging system of claim 17 wherein the appended code comprises at least one of an integer message sender, an integer message type, an integer message class, an integer message priority, an integer message length, and a message body.

25. The messaging system of claim 24 wherein the at least one of the message sender, type, class and priority is comprised of low order bits of an encryption string.

26. The messaging system of claim 17 wherein each process contains an instance of a message interface class, for transmitting and receiving messages.

27. The messaging system of claim 26 wherein the message interface class is Messaging Application Programming Interface (M. API).

28. The messaging system of claim 17 further comprising means for registering the first and second processes with a messaging system to receive at least one respective type of messages.

29. A messaging system for exchanging messages between components comprising:
    means for registering first and second processes with a messaging system to receive at least one respective type of message;
    means for providing a message from a first process;
    means for appending to the message a code indicating at least one descriptive parameter of the message;
    means for transmitting the message to a second process; and
    means for interpreting the code so as to enable computation of the message by the second process across a plurality of different controller;
    wherein the appended code comprises a message tuple having a plurality of fields corresponding to the descriptive parameters and wherein the means for registering defines values for the message tuple that provide optional filtering according to the message types indicated by each field.

30. The messaging system of claim 29 wherein the descriptive parameters indicated by the plurality of fields comprise integer message sender, integer message type, integer message class, and integer message priority.

31. The messaging system of claim 30 wherein the means for registering comprises means for specifying a set of global parameters, wherein the global parameters are used for a client connection.

32. The messaging system of claim 31 wherein the global parameters comprise: a message mode, selected from guaranteed delivery and best effort; a dead client age; a stale message age; a queue limit multiplier; and a queue limit divisor.

* * * * *